Patented Dec. 15, 1942

2,304,837

UNITED STATES PATENT OFFICE 2,304,837

HYDROXY PREGNANE DERIVATIVES AND PREPARATION OF SAME

Russell Earl Marker, State College, Pa., assignor to Parke, Davis & Company, Detroit, Mich., a corporation of Michigan No Drawing. Application March 8, 1941, Serial No. 382,449

18 Claims. (Cl. 260—397.3)

This invention relates to hydroxypregnane derivatives and preparation of the same, and more particularly to the preparation of 16,20-dihydroxypregnane compounds and to their oxidation to keto-pregnene derivatives.

Some of the new 16,20-dihydroxypregnane compounds of this invention are prepared according to an entirely new method by the action of per-compounds on steroidal sapogenins.

Other new 16,20-dihydroxypregnane compounds described herein are prepared and claimed in my copending application, Serial No. 400,559, filed June 30, 1941.

I have found that the steroidal sapogenins, and nuclear transformation products thereof in which the side chain attached to ring D is intact and like that of the sapogenins themselves, can be treated with per-compounds to yield 16,20-dihydroxypregnane compounds according to the following scheme:

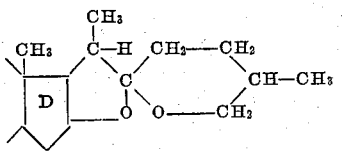

I

| per-compound, then
| hydrolysis

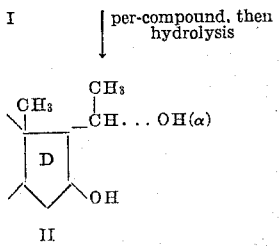

II where only those changes are shown which occur in the side chain attached to ring D.

By a per-compound is meant hydrogen peroxide or a substance derived therefrom.

It is to be understood that a distinction [C. F. Price, Per-acids and Their Salts, p. 1 ff., Longmans-Green (1911)] is to be made between these substances, which, for brevity, are properly called per-compounds, and another type of compound, exemplified by periodates, permanganates, etc., which are not per-compounds. While the true per-compounds, to which this invention relates, are derived from hydrogen peroxide and are supposed to contain at least two oxygen atoms linked together (as —O—O—, or =O—O, the exact nature of the linkage not being definitely known), the false "per-compounds," of which "lead peroxide" is another example, contain no oxygen-oxygen linkages, do not liberate hydrogen peroxide when treated with acids, and in reality represent higher valency states of the atom bonded to the oxygen. This may be made clearer by the following examples. True per-compounds include—

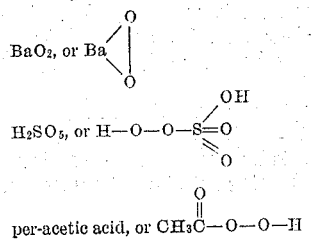

False per-compounds include—

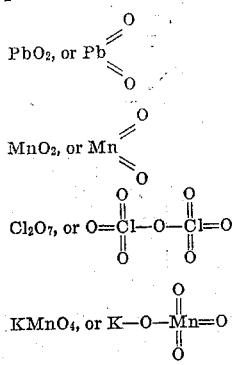

Where in the appended claims the term "per-compound" is used it refers to the "true per-compound" as above defined.

In my copending application, Serial No. 400,559, filed June 30, 1941, I have shown that 16,20-dihydroxypregnane compounds can also be obtained from the sapogenins by a process involving essentially the following steps: the sapogenin is first converted into a pseudo-sapogenin compound, for example, according to my copending application, Serial No. 393,667, filed May 15, 1941; then this compound is oxidized under mild conditions to form a 20-keto-16(δ-acyloxyisocaproxy)-pregnane compound; this is then reduced, for example, by catalytic hydrogenation or by treatment with the combination of aluminum isopropylate and isopropyl alcohol; and the resulting product is hydrolyzed with formation of a 16,20-dihydroxypregnane compound of the structure

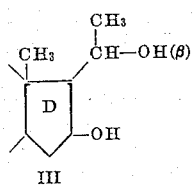

III

It will be noted that the 16,20-dihydroxypregnane compounds prepared by the action of per-compounds on sapogenins have been represented herein by the structure II wherein the 20-hydroxyl group is shown to be of the (α)-configuration, while the 16,20-dihydroxy compounds prepared by the reduction of 20-keto-16(δ-acyloxyisocaprooxy) pregnane compounds, prepared according to my copending application, Serial No. 400,559, filed June 30, 1941, and designated herein by structure III, are shown to be of the (β)-configuration with respect to the hydroxyl group at C—20. While this has not yet been definitely demonstrated to be correct, it is believed that these structures are plausible. The 16,20-dihydroxypregnane compounds prepared by one method are not identical with those prepared by the other method indicating that the substances are probably isomeric about 16 or 20, or both. Since both types of compounds are prepared from the sapogenins it seems likely that they have the same configuration at C—16. Accordingly, they may be assumed to differ about C—20, and the herein assigned structures logically follow.

According to another feature of my invention, I oxidize 16,20-dihydroxypregnane compounds under mild conditions with production of unsaturated keto-steroids of the following structure

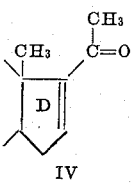

and

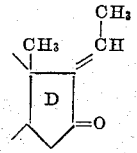

In many cases it appears that a mixture of both of these possible types of compounds is formed but because of the difference in properties of the two types of substances, one compound frequently is more readily isolated than the isomer. It may be also that differences in configuration of the hydroxyl groups at 16 and 20 influence to some extent the course of the reaction.

My invention may be further illustrated by the following examples.

Example 1

A mixture of 1 g. of sarsasapogenin acetate, 4 g. of potassium persulfate, 150 cc. of 90% acetic acid and 1 cc. of concentrated sulfuric acid is refluxed for two hours. Water is added and the precipitated solid taken up in ether and washed with water and 3% sodium hydroxide. The ether is evaporated and the residual material is hydrolyzed with ethanolic potassium hydroxide. Water is added to the alkaline solution and the precipitated solid taken up in ether and crystallized from ether-penane as small white crystals of M. P. 223–226° C. of pregnanetriol-3(β),16,20(α)

With benzoyl chloride in pyridine the above pregnanetriol-3(β),16,20(α) gives a benzoate which crystallizes from methanol as white prisms of M. P. 185–187° C.

With boiling acetic anhydride the above pregnanetriol-3(β),16,20(α) gives a triacetate which crystallizes from dilute ethanol as white crystals of M. P. 108–111° C.

Example 2

(a) A solution of sarsasapogenin acetate (10 g.) in 500 cc. of glacial acetic acid is mixed with 100 g. of the dry reagent of von Baeyer and Villiger (prepared from 20 g. of potassium persulfate, 22 g. of concentrated sulfuric acid and 60 g. of potassium sulfate). The mixture is stirred vigorously at room temperature for three days. Sufficient dilute sodium hydroxide solution is added to neutralize the sulfuric acid and the mixture is concentrated to 50 cc. in vacuo. The residue is poured into water and filtered. This is hydrolyzed by refluxing for fifteen minutes in ethanolic potassium hydroxide. Water is then added and the precipitated material is filtered, washed with water and dried. This product has M. P. 224–223° C. The yield is 4.0 g. After recrystallization from methanol it melts at 227–228° C. This is pregnanetriol-3(β),16,20(α) identical with that of Example 1.

(b) A mixture of 2 g. of the above pregnanetriol-3(β)16,20(α), 10 g. of aluminum isopropylate, 25 cc. of cyclohexanone and 175 cc. of toluene is refluxed for eighteen hours. Then water and ether are added and the ethereal layer is separated. The ethereal layer is washed with hydrochloric acid, dilute sodium hydroxide solution and with water and then the ether is removed on a steam bath. The residue is steam distilled for two hours to remove the excess cyclohexanone and toluene. Then the residual liquor containing suspended oily drops is extracted with ether. After separation of the ethereal layer and removal of the ether on a steam bath, the residue is dried by distilling benzene from it. The residue is freed of hydroxylated by-products by heating it for an hour with about 2 g. of succinic anhydride and 10 cc. of pyridine. The pyridine solution is poured into water and extracted with ether. The pyridine is removed by washing with water and freed of the half succinates by washing with saturated sodium carbonate solution. The ethereal solution on evaporation gives a white solid which is recrystallized from methanol. This is $\Delta^{17}$-pregnenedione-3,16 of M. P. 179–182° C. It may be represented by the formula

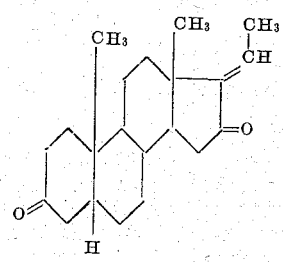

Example 3

(a) A mixture of 1 g. of epi-sarsasapogenin acetate, 4 g. of potassium persulfate, 150 cc. of 90% acetic acid and 1 cc. of concentrated sulfuric acid is refluxed for two hours. Water is added and the precipitated solid taken up in ether and washed with water and 3% sodium hydroxide. The ether is evaporated and residual material is hydrolyzed with ethanolic potassium hydroxide. Water is added to the alkaline solution and the precipitated solid taken up in ether and crystallized from ether-pentane as small white crystals of M. P. 206–207° C. This is pregnanetriol-3(α),16,20(α).

With benzoyl chloride and pyridine the above triol forms a tribenzoate which, after crystallization from aqueous acetone, is obtained as white needles of M. P. 153-155° C.

The above pregnanetriol-3(α),16,20(α) when treated with aluminum isopropylate and cyclohexanone as in Example 2(b) yields Δ$^{17}$-pregnenedione-3,16 of M. P. 180° C. identical with that of Example 2(b).

*Example 4*

(a) An allo-pregnanetriol-3(α),16,20(α) of M. P. 300-302° C. has been isolated from pregnant mares' urine (Haslewood, Marrian and Smith, Biochem., J., 28, 1316, 1934; Marker et al., J. Am. Chem. Soc., 60, 210 (1938)) and its structure elucidated by Marker and Wittle, J. Am. Chem. Soc., 61, 855 (1939).

This triol is epimeric with regard to the configuration of the hydroxyl group at C$_{16}$ as compared to the triols obtained from the sapogenins.

(b) A mixture of 3 g. of allo-pregnanetriol-3(α),16,20(α) (from mares' urine), 15 g. of aluminum isopropylate, 40 cc. of cyclohexanone and 250 cc. of toluene is refluxed for eighteen hours. Water and ether are added and the ethereal layer separated, and shaken with hydrochloric acid, with dilute sodium hydroxide solution, and finally with water. The solvents are removed in vacuo and the residue is steam distilled for two hours. The residual liquor is extracted with ether, and then the ether removed on a steam bath. The residue is sublimed in a high vacuum at 130-140° C. The sublimate is crystallized from ether-pentane, and finally directly from ethyl ether. It melts at 209-211° C. and is Δ$^{16}$-allo-pregnenedione-3,20.

*Example 5*

(a) A mixture of 6 g. of sarsasapogenin acetate, 50 cc. of 30% hydrogen peroxide and 300 cc. of acetic acid is heated for seven hours at 70° C. Then the solution is concentrated in vacuo, diluted with water and extracted with ether. The ethereal extract is washed well with water and then the ether is removed on a steam bath. The residue is hydrolyzed by refluxing it with an excess of methanolic potassium hydroxide solution. The hydrolyzed mixture is diluted with water, extracted with ether and the ethereal extract washed with water. After removing the ether on a steam bath the residue is crystallized from acetone to give pregnanetriol-3(β),16,20(α), M. P. about 223° C.

The triol thus obtained is identical with that of Example 1.

(b) To a soluton of 900 mg. of the above pregnanetriol-3(β),16,20(α) in 35 cc. of acetic acid is added slowly and with cooling a solution of 400 mg. of chromic anhydride in 5 cc. of water and 15 cc. of acetic acid. The solution is allowed to stand at room temperature for twenty minutes and then it is diluted with water and the organic material taken up in ether. The ethereal layer is separated, washed with sodium hydroxide solution and then with water, and then evaporated on a steam bath. The residual colorless, neutral oil is largely Δ$^{16}$-pregnenedione-3,20 together with some Δ$^{17}$-pregnenedione-3,16. The Δ$^{16}$-pregnenedione-3,20 may be isolated and purified by crystallizing the mixture repeatedly from acetone.

*Example 6*

(a) Diosgenin is treated (as set forth more fully in my copending application, Serial No. 382,451, filed March 8, 1941) for six to fifteen hours with acetic anhydride at 200° C., thereby forming pseudo-diosgenin diacetate. After crystallization from methanol, the pseudo-diosgenin diacetate has a melting point of 977-100° C.

(b) Pseudo-diosgenin diacetate is oxidized with chromic anhydride in acetic acid at 28° C., as set forth more fully in the copending application of Russell Earl Marker, Harry Means Crooks, Jr., and Eugene Leroy Wittle, Serial No. 393,666, filed May 15, 1941. Thus there is obtained the corresponding 20-keto-16-(δ-acyloxyisocaprooxy)-pregnane compound of melting point 85-86° C. This compound is believed to have the structure,

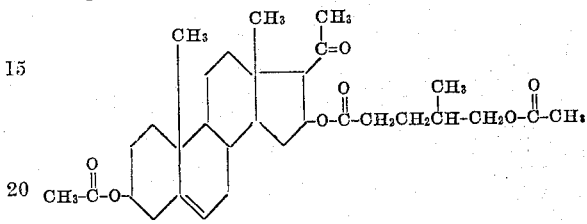

and it may be designated as Δ$^5$-pregnenediol-3(β),16-one-20 3-acetate-16-(δ-acetoxy)-isocaproate.

(c) A mixture of 5 g. of Δ$^5$-pregnenediol-3-(β), 16-one-20 3-acetate-16(δ-acetoxy)-isocaproate, 10 g. of aluminum isopropylate and 400 cc. of dry isopropyl alcohol is refluxed for seven hours. Then the mixture is distilled through a column over a period of five hours and the residue is refluxed with 500 cc. of 2% methanolic potassium hydroxide for thirty minutes. The mixture thus obtained is diluted with water and the precipitate collected and crystallized from methanol. Thus there is obtained Δ$^5$-pregnenetriol-3-(β), 16,20(β) of melting point 281-285° C.

When refluxed for thirty minutes with an excess of acetic anhydride it forms a triacetate which may be isolated in the usual manner. After crystallization from ether-pentane it has a melting point of 143° C.

(d) A mixture of 3 g. of the above Δ$^5$-pregnenetriol-3(β), 16,20(β), 6 g. of aluminum t.-butylate and 200 cc. of acetone is refluxed for ten hours. Then the mixture is diluted with water and extracted thoroughly with ether. The ethereal solution is washed with dilute sulfuric acid and with water and then the ether is removed on a steam bath. The residue is crystallized from ether-pentane, thereby giving Δ$^{4,16}$-pregnadienedione-3,20 as white crystals, M. P. 185° C. It may be represented by the following structural formula:

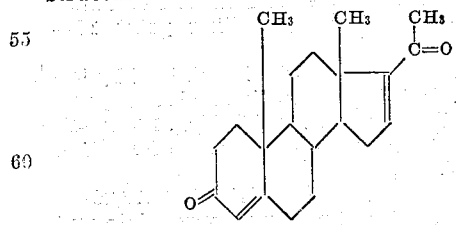

*Example 7*

(a) Exo-dihydro-pseudo-tigogenin diacetate, M. P. 122-124° C., is prepared, for example, as set forth in my copending application, Serial No. 382,450, filed March 8, 1941, by the catalytic hydrogenation of pseudo-diosgenin diacetate.

(b) Exo-dihydro-pseudo-tigogenin diacetate is oxidized with chromic anhydride in acetic acid at 28° C., as set forth more fully in the copending application of Russell Earl Marker, Harry Means Crooks, Jr., and Eugene Leroy Wittle, Serial No. 393,666, filed May 15, 1941. Thus, there is obtained the compound of M. P. 102–104° C. representable by the following formula:

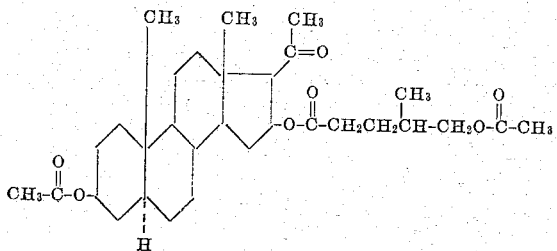

This compound may be designated as allo-pregnanediol-3(β)-16-one-20 3-acetate-16(δ-acetoxy)-isocaproate.

(c) The substance of melting point 102–104° C. designated as allo-pregnanediol-3(β)-16-one-20 3-acetate-16 (δ-acetoxy)-isocaproate is hydrogenated by shaking 2 g. of it with 3 g. of platinum oxide catalyst in 100 cc. of glacial acetic acid in a hydrogen atmosphere for two hours at room temperature. At the end of this time, the temperature is raised to 70° C. and the hydrogenation continued for an additional hour and a half. Then the solution is filtered and the solvent removed under reduced pressure. The residual syrup is allo-pregnanetriol-3(β),16,20(β)-3-acetate-16-(δ-acetoxy)-isocaproate of the following formula:

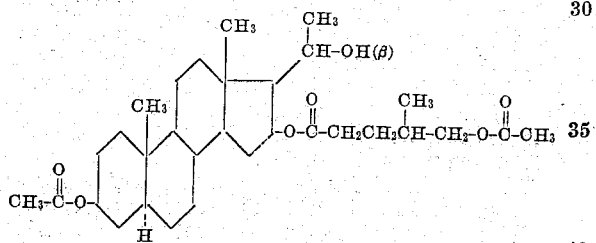

While this substance may be further purified by crystallization, this is not necessary for the next step.

(d) The above residue is refluxed for fifteen minutes with a 2% alcoholic potassium hydroxide solution. Then the mixture is diluted with water and the precipitate collected and recrystallized from methanol. The substance thus obtained, melting point 285–288° C., has the empirical formula $C_{21}H_{36}O_3$ and is an allopregnanetriol-3(β), 16,20(β).

When the above triol is refluxed in acetic anhydride solution for thirty minutes and the acetylated mixture worked up, there is obtained an allo-pregnanetriol triacetate of melting point 161–163° C.

The same allo-pregnanetriol is obtained by the analogous catalytic hydrogenation and subsequent hydrolysis of the $\Delta^5$-pregnenediol-3(β), 16-one-20 3-acetate-16 (δ-acetoxy)-isocaproate of melting point 84–85° C.

(e) The above allo-pregnanetriol-3(β),16,20(β) may be oxidized with aluminum isopropylate and cyclohexanone as described in Example 2(b). Thus there is obtained, after fractionally crystallizing the product from acetone, $\Delta^{17}$-allo-pregnenedione-3,16, M. P. 188–190° C. and $\Delta^{16}$-allo-pregnenedione-3,20, M. P. 210° C.

It will be apparent in view of the above examples that my invention is capable of numerous variations in regard to reagents, starting materials, temperature, reaction conditions and the like, all of which variations fall within the scope of my invention.

Steroidal sapogenins which may be oxidized to 16,20-dihydroxypregnane compounds, according to the teachings of this invention, include not only the aglycones of the naturally occurring steroidal saponins, but also their nuclear transformation products, i. e., the substances derived from the aglycones by changes in rings A and/or B which leave the side chain attached to ring D still intact and like that in the aglycone. Thus, the invention may be practiced on steroidal sapogenins such as chlorogenin, 3-desoxysarsasapogenin, the sarsasapogenyl chlorides and the like.

Also, there may be employed steroidal sapogenins having either of the two possible configurations with regard to C—22, i. e., sapogenins of either the sarsasapogenin or of the tigogenin type configuration with regard to the side chain. For a discussion of this type of isomerism see Marker et al., J. Am. Chem. Soc. 62 1162 (1940).

In certain groups such as double bonds, ketone groups, amino groups and like readily oxidized groups are present in the nucleus in rings A and B of the steroidal sapogenin, these groups are usually also reacted upon by the per compound. In general, the course of this reaction may be predicted as follows: Usually nuclear double bonds are hydroxylated, i. e. are converted into glycols; ketone groups are oxidized with formation of lactones. These transformations may be illustrated below for the cases of sarsasapogenone and diosgenin:

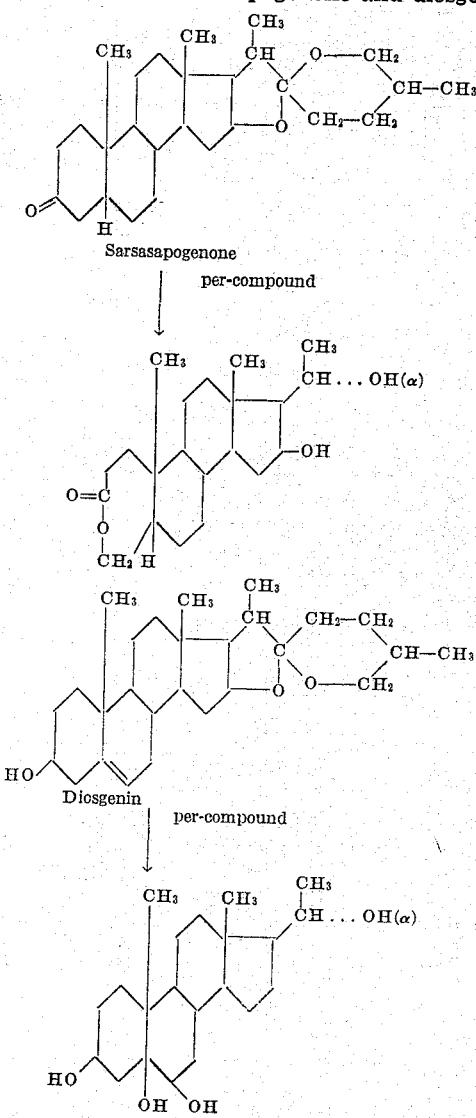

On the other hand, nuclear hydroxyl groups surprisingly require no protection and in the course of treatment with the per-compound, if an organic acid is used as a solvent, are converted into the corresponding esters.

Nuclear groups such as ester groupings, ether groupings, and halogen groupings, are not affected by treatment with the per-compounds.

Per-compounds suitable for the practice of this invention are derivatives of hydrogen peroxide. I prefer to use Caro's acid ($H_2SO_5$), ammonium persulfate [$(NH_4)_2S_2O_8$], potassium persulfate or hydrogen peroxide, but other per-compounds such as per-acetic acid, benzoyl peroxide, sodium per-borate or sodium per-carbonate may be used. The per-compound may be prepared and used in statu nascendi by electrolytic methods, employing anodic oxidation of a sulfuric acid-acetic acid solution of the steroidal sapogenin. In all cases, however, I find it best to conduct the oxidation under acidic conditions, preferably in the presence of a non-reducing mineral acid like sulfuric or phosphoric acid. As solvents I use acetic acid, water, alcohol, ethyl acetate, benzene, petroleum ether, or in general, like solvents not having reactive carbon-carbon double bonds, or amino, ketonic, or aldehydic groups. Thus I avoid the use of aniline or acetone for these are attacked under the conditions of oxidation. Furthermore, I may vary the conditions of temperature and duration of reaction, but in general I employ ordinary temperatures, from 0° C. to about 150° C., and adjust the reaction time accordingly. I prefer to operate at about room temperature (15–35° C.) and allow the oxidation to proceed for a number of days, as from 1 to 15 days, with perhaps occasional addition of more of the per-compound. Longer times are not injurious, but offer no particular advantage, since at the end of one or two weeks, the reaction is substantially complete. The conditions of reaction often influence the proportion of product formed, the preferred conditions already described usually giving largest amounts of the 16,20-dihydroxypregnane compounds. Likewise, the effect of light, such as sun light, is often important, and sometimes best results are obtained by conducting the oxidation in the dark. Other times, a moderate amount of light is beneficial. In all cases, the optimum conditions are readily determined by a few trials.

When organic acids, such as acetic or propionic acids, are used as solvents, the 16,20-dihydroxypregnane compounds are usually obtained in the form of their esters, e. g. the acetates or propionates, respectively, and to obtain the parent hydroxy compound it is necessary to subject the esterified steroids to a saponification procedure. This hydrolysis may be accomplished by treating the reaction mixture with aqueous or alcoholic fixed alkalies such as alcoholic potassium hydroxide or the like. However, acidic hydrolysis may also be employed, as for example by hydrolysis with 2% aqueous-alcoholic sulfuric acid.

In the step of mild oxidation of 16,20-dihydroxypregnane compounds into unsaturated keto-steroids there may be used a wide variety of mild oxidizing agents. Also, there may be used strong oxidizing agents for this operation if the amount of oxidizing agent is limited in quantity to that required by theory, so that an effectively mild oxidation is achieved.

As mild oxidizing agents there may be mentioned the combination of an aluminum alcoholate and a ketone or similar substance capable of dehydrogenating an alcohol to a ketone grouping. Thus, there may be employed such combinations as aluminum tert-butylate and acetone, aluminum isopropylate and cyclohexanone and the like. Other combinations of this character include the combination of a halomagnesium alcoholate such as $Cl-Mg-OC_2H_5$ and a ketone such as acetone, cyclohexanone or the like. The halomagnesium alcoholate is readily prepared by treating a Grignard reagent with an alcohol.

As strong oxidizing agents which may be employed in this invention when used in limited quantities, there may be mentioned chromic anhydride in acetic acid or sodium dichromate in acetic acid acidulated with sulfuric acid.

In all cases it appears that the oxidation product is a mixture of unsaturated keto steroids representable by the formulae,

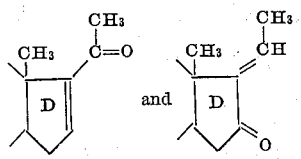

but the relative amounts of the two types of steroids may vary considerably depending on the configuration of the 16,20-dihydroxypregnane compound oxidized and on the conditions of oxidation employed. Also, the two types of compounds formed differ in their properties and in a particular instance one of the two possible products may have properties much more favorable for isolation than is the case with the other product. In general, however, no great difficulty is experienced in isolating the desired substance.

Other modes of isolating and purifying the products of this invention may be used instead of those indicated in the examples. The method selected for isolation and purification of a particular product will be determined by its properties, but in general, the methods will employ customary procedures in this act such as fractional crystallization, partition between immiscible solvents, high vacuum distillation, chromatographic adsorption and like devices.

While I have described and illustrated certain forms of my invention and have set these forth in terms of a particular theory, I wish it to be understood that my invention is not to be limited to these forms, nor is its operability in any ways effected by the ultimate correctness of the particular theory herein employed.

What I claim as my invention is:

1. The process for preparing a steroidal compound which comprises subjecting a steroidal sapogenin to oxidation at the sidechain attached to ring D by treating said sapogenin under acidic conditions with a per-compound, and hydrolyzing the reaction mixture, with production of a steroid having in ring D the structure,

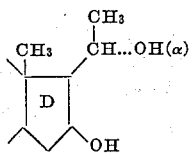

2. The process for preparing a steroidal compound which comprises subjecting a steroidal sapogenin to oxidation at the sidechain attached to ring D by treating said sapogenin under acidic conditions with a member of the class consisting of persulfuric acids and their salts, and hydrolyzing the reaction mixture, with production of a steroid having in ring D the structure,

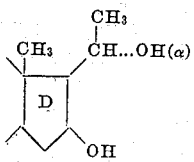

3. The process for preparing a steroidal compound which comprises subjecting a steroidal sapogenin of the formula,

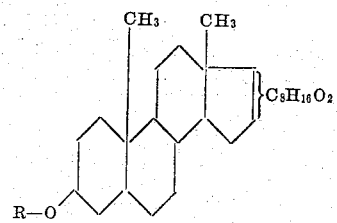

where R is a member of the class consisting of hydrogen and acyl radicals, to oxidation at the sidechain attached to ring D by treating said sapogenin under acidic conditions with a member of the class consisting of persulfuric acids and their salts, and hydrolyzing the reaction mixture, with production of a steroid representable by the formula,

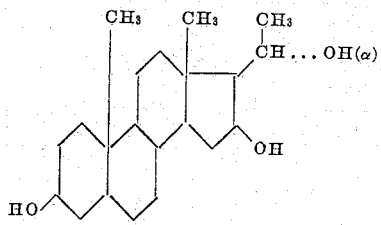

4. A steroidal compound having in ring D thereof the structure,

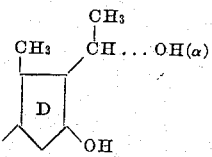

where the carbon-oxygen linkage at $C_{16}$ has the same configuration as in the steroidal sapogenins.

5. A steroidal compound representable by the formula,

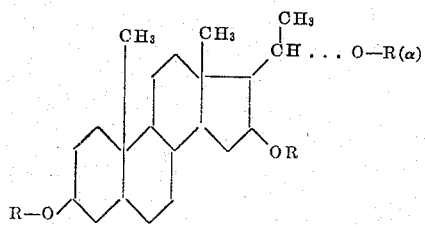

where R is a member of the class consisting of hydrogen and acyl radicals and where the carbon-oxygen linkage at $C_{16}$ has the same configuration as in the steroidal sapogenins.

6. Pregnanetriol-3($\beta$),16,20($\alpha$), melting at approximately 228° C.

7. Pregnanetriol-3($\alpha$),16,20($\alpha$), melting at approximately 207° C.

8. The process for preparing an unsaturated steroidal compound which comprises mildly oxidizing a steriod having in ring D the structure,

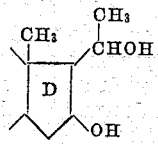

with production of a compound of the class consisting of unsaturated keto-steroids having in ring D the structures,

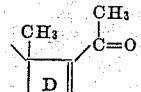

and

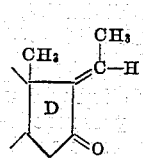

9. The process for preparing an unsaturated steroidal compound which comprises mildly oxidizing a steroid having in ring D the structure,

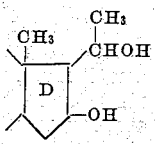

by treating it with a ketone in the presence of an aluminum alcoholate, with production of a compound of the class consisting of unsaturated keto-steroids having in ring D the structures,

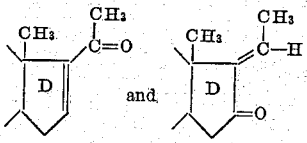

10. The process for preparing a keto steroid having in the ring D the structure,

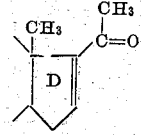

which comprises reacting a steroid having in ring D the structure,

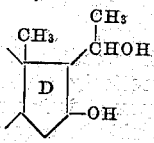

with a ketone in the presence of an aluminum alcoholate.

11. The process for the preparation of steroidal compounds which comprises subjecting a steroidal sapogenin to oxidation at the sidechain attached to ring D by treating said sapogenin under acidic conditions with a per-compound, and hydrolyzing the reaction mixture, with production of a steroid having in ring D the structure,

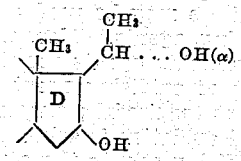

and mildly oxidizing said steroid, with production of unsaturated keto-steroids having in ring D the structures,

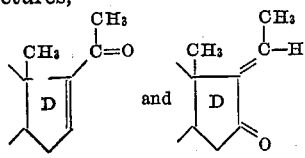

12. The process for the preparation of steroidal compounds which comprises subjecting a steroidal sapogenin to oxidation at the sidechain attached to ring D by treating said sapogenin under acidic conditions with a member of the class consisting of persulfuric acids and their salts, and hydrolyzing the reaction mixture, with production of a steroid having in ring D the structure,

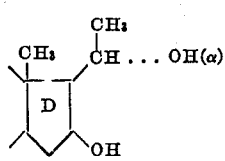

and mildly oxidizing said steroid by treating it with a ketone in the presence of an aluminum alcoholate, with production of unsaturated keto-steroids having in ring D the structures,

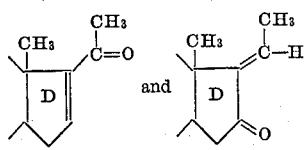

13. The process for the preparation of steroidal compounds which comprises subjecting a steroidal sapogenin of the formula,

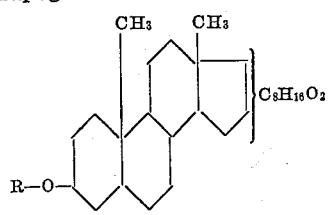

where R is a member of the class consisting of hydrogen and acyl radicals, to oxidation at the sidechain attached to ring D by treating said sapogenin under acidic conditions with a member of the class consisting of persulfuric acids and their salts, and hydrolyzing the reaction mixture, with production of a steroid representable by the formula,

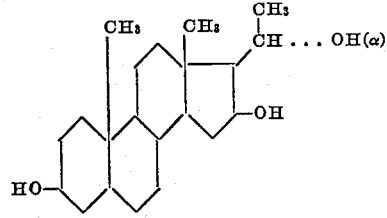

and mildly oxidizing said steroid by treating it with a ketone in the presence of an aluminum alcoholate, with production of unsaturated keto-steroids representable by the formulae,

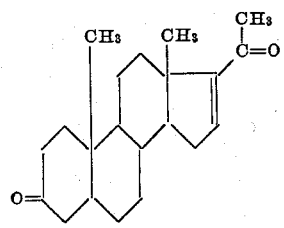

and

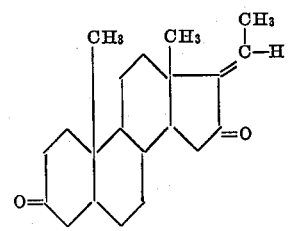

14. The process for preparing pregnanetriol-3($\beta$),16,20($\alpha$) which comprises reacting sarsasapogenin in acetic acid at room temperature for 1-15 days with a water-soluble persulfate in the presence of sulfuric acid, and then hydrolyzing the reaction mixture and isolating the pregnanetriol-3($\beta$),16,20($\alpha$).

15. The process for preparing pregnanetriol-3($\beta$),16,20($\alpha$) which comprises reacting an ester of sarsasapogenin in acetic acid at room temperature for 1-15 days with a water-soluble persulfate in the presence of sulfuric acid, and then hydrolyzing the reaction mixture and isolating the pregnanetriol-3($\beta$),16,20($\alpha$).

16. The process according to claim 2 wherein the oxidation is conducted in acetic acid at room temperature for 1-15 days.

17. The process for preparing $\Delta^{16}$-pregnenedione-3,20 which comprises reacting a pregnanetriol-3,16,20 with a ketone in the presence of an alumium alcoholate, and isolating the resulting $\Delta^{16}$-pregnenedione-3,20.

18. The process for preparing $\Delta^{16}$-allo-pregnenedione-3,20 which comprises reacting an allo-pregnanetriol-3,16,20 with a ketone in the presence of an aluminum alcoholate, and isolating the resulting $\Delta^{16}$-allo-pregnenedione-3,20.

RUSSELL EARL MARKER.